(No Model.) 2 Sheets—Sheet 1.

J. R. MacCOLL.
LAPPET LOOM.

No. 570,260. Patented Oct. 27, 1896.

WITNESSES
Harry J. Garceau
James W. Brennan

INVENTOR:
James R. MacColl
By A. Scholfield
ATTY.

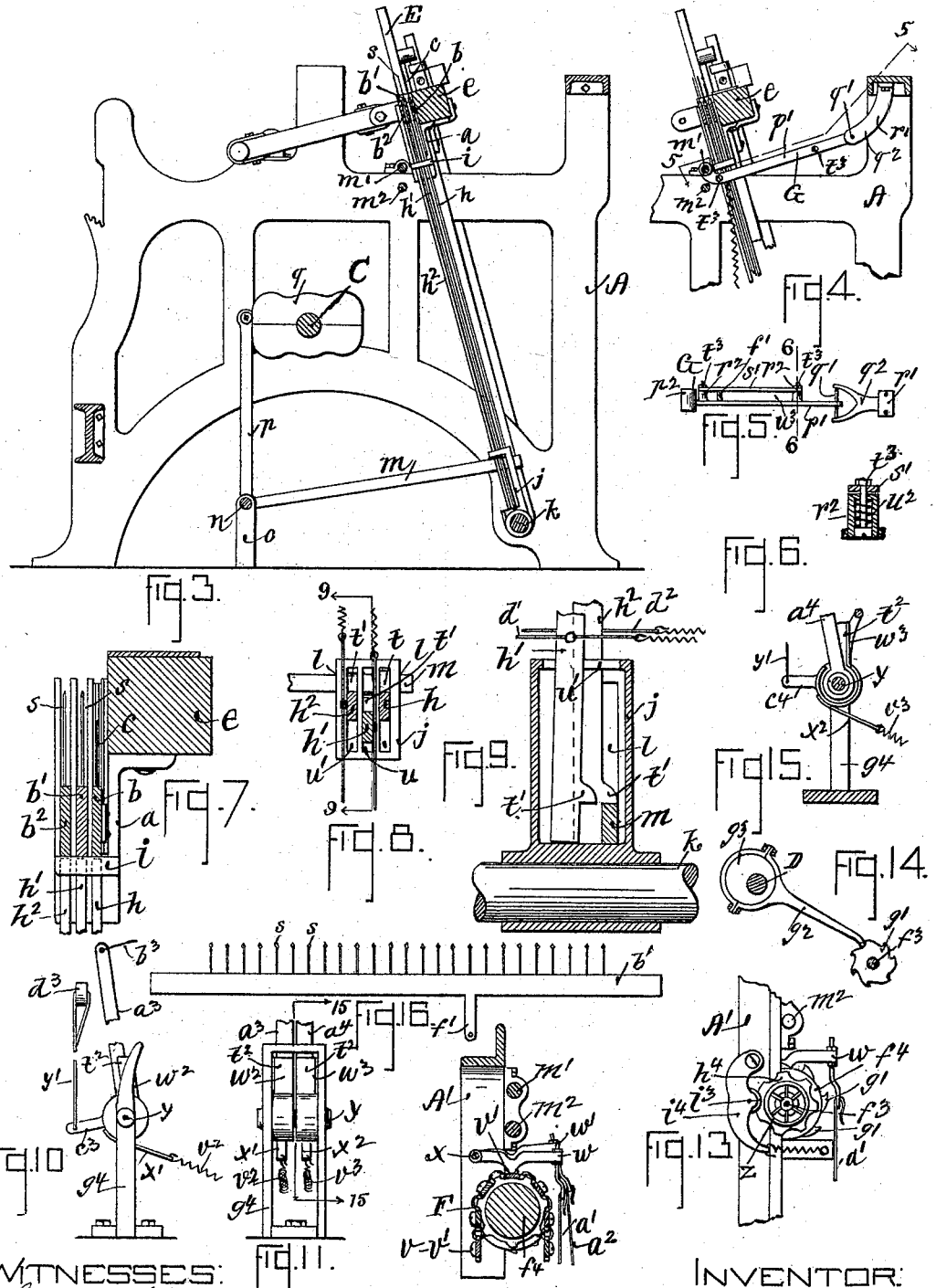

UNITED STATES PATENT OFFICE.

JAMES R. MacCOLL, OF PAWTUCKET, RHODE ISLAND.

LAPPET-LOOM.

SPECIFICATION forming part of Letters Patent No. 570,260, dated October 27, 1896.

Application filed June 25, 1895. Renewed March 14, 1896. Serial No. 583,265. (No model.)

*To all whom it may concern:*

Be it known that I, JAMES R. MACCOLL, a subject of the Queen of Great Britain, residing at Pawtucket, in the county of Providence and State of Rhode Island, have invented a new and useful Improvement in Lappet-Looms, of which the following is a specification.

My improvement is adapted for attachment to ordinary cotton or woolen looms already in use, so that the principle of lappet-weaving may be successfully employed in such looms; and it consists in the improved construction and arrangement of parts, as hereinafter fully set forth and claimed.

Figure 1:
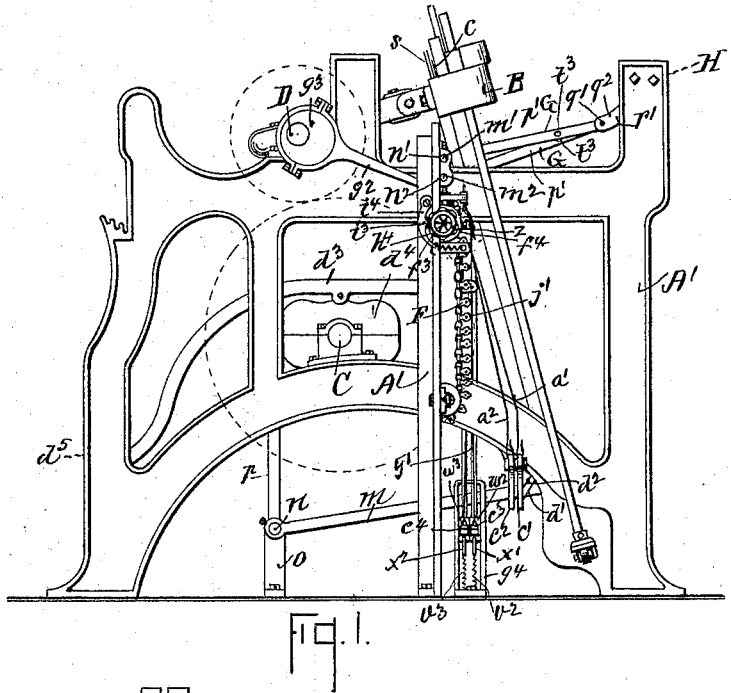
Figure 2:
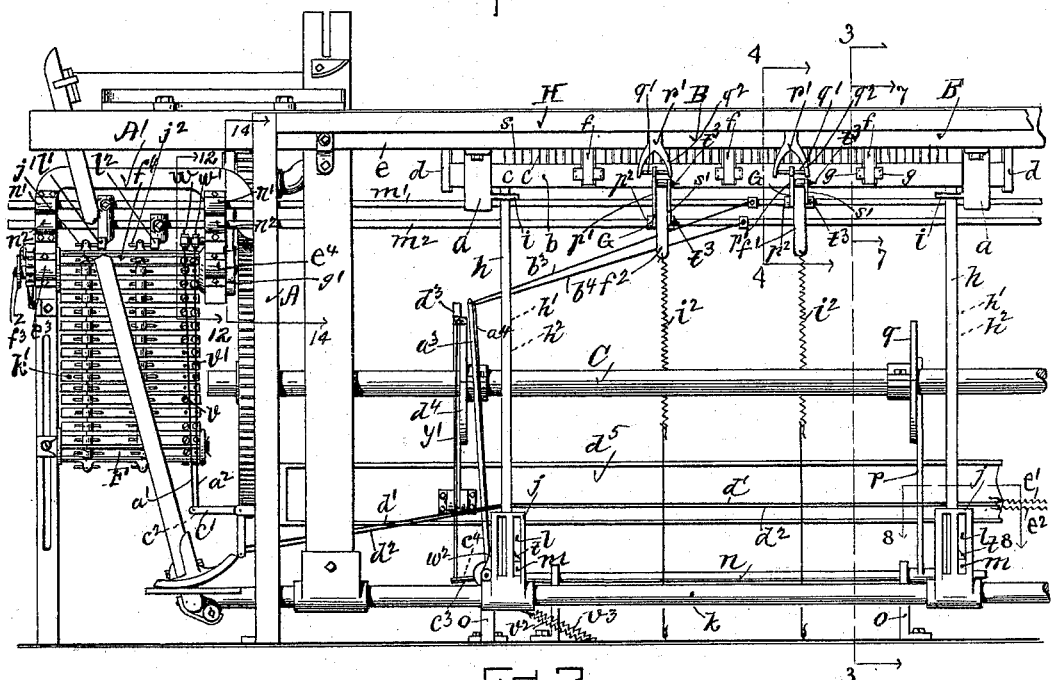

In the accompanying drawings, Figure 1 represents an end elevation of a lappet-loom provided with my improvement, the needles being in their elevated position. Fig. 2 represents a detail front elevation of the same with the needles in their lower position. Fig. 3 represents a vertical section taken as in the line 3 3 of Fig. 2, showing the needles in their elevated position, as in Fig. 1. Fig. 4 represents a detail vertical section taken in the line 4 4 of Fig. 2, with the needles in their elevated position. Fig. 5 represents a section taken in the line 5 5 of Fig. 4, showing a top view of one of the guide-arms. Fig. 6 represents a detail section taken in the line 6 6 of Fig. 5. Fig. 7 represents an enlarged detail section taken as in the line 4 4 of Fig. 2. Fig. 8 represents an enlarged detail section taken in the line 8 8 of Fig. 2. Fig. 9 represents a detail section taken in the line 9 9 of Fig. 8. Figs. 10 and 11 are detail views of a portion of the mechanism for actuating the needle-bars. Fig. 12 represents a detail section taken through the pattern-chain in the line 12 12 of Fig. 2. Fig. 13 represents an end view of the sprocket-roll for the pattern-chain. Fig. 14 represents a section taken in the line 14 14 of Fig. 2, showing the ratchet mechanism for actuating the sprocket-roll. Fig. 15 represents a section taken in the line 15 15 of Fig. 11. Fig. 16 represents a side view of one of the needle-bars.

In the drawings, A represents one of the end frames of the loom; B, the lay; C, the cam-shaft, and D the crank-shaft. To the bottom of the lay-beam $e$ are secured the pendent guide-brackets $a\,a$, which serve to hold the needle-bars $b'\,b^2$, and also the shuttle-guide bar $b$, to which are attached the shuttle-guide pins $c\,c$, which serve to prevent contact of the shuttle with the needles, the shuttle-guide bar $b$ being guided at its ends for up-and-down movement by means of the guide-brackets $d\,d$ and the needle-bars $b'\,b^2$ left free at their ends and adapted for both up-and-down and endwise movement. The shuttle-guide bar $b$ is also supported against the lateral strain caused by the contact of the traveling shuttle with the shuttle-guide pins $c\,c$ by means of the pendent guides $f\,f\,f$, which are rabbeted at their edges, the bar $b$ being connected to the said guides, so as to slide up and down thereon, by means of the guide-pieces $g\,g$, which are attached to the side of the bar and lap over the rabbeted edges of the said guides $f\,f$.

Immediately under the needle-bars $b'\,b^2$ and the shuttle-guide bar $b$ are placed the lifting-rods $h'$, $h^2$, and $h$, respectively, the said lifting-rods being held loosely at their upper ends in a lateral extension $i$ of the guide-bracket $a$ and at their lower ends in the holder $j$, attached to the pivoting-rod $k$ of the lay B, the said holder being provided with the slot $l$, adapted to receive the forward end of the lifting-arm $m$, which is secured to the rock-shaft $n$, having its bearings in suitable standards $o$, attached to the floor, the said rock-shaft being actuated to cause the required up-and-down movement of the lifting-arm $m$ by means of the upright arm $p$ and the cam $q$, secured to the cam-shaft C, the lifting-arm $m$ being shown in its elevated position in Figs. 1 and 3, in which position the needles $s$ will be at their highest position in the shed.

The lifting-rods $h\,h$, which serve to cause the up-and-down movement of the shuttle-guide bar $b$, are provided with projecting hooks $t$, (shown in Fig. 8,) which are held in continuous engagement with the top of the lifting-arm $m$, so that the shuttle-guide bar $b$ will be caused to rise and fall uniformly at each beat of the lay.

The lifting-rods $h'\,h'$ and $h^2\,h^2$, which serve to raise the needle-bars $b'\,b^2$, are guided at their lower ends in the slots $u\,u'$, made in the upper end of the holders $j\,j$, the said lifting-rods being each provided with a projecting lug $t'$, adapted for engagement and disengagement with the lifting-arm $m$, the said lifting-rods $h'\ h'$ and $h^2\ h^2$ being actuated for disengagement with the lifting-bars $m\ m$ by means of the pins $v\ v'$ of the pattern-chain F, which is held for progressive movement in the projecting frame A' at the end of the loom, suitable operative connection being made between the lifting-rods and the pins $v\ v'$ of the pattern-chain by means of the levers $w\ w'$, pivoted to the stud $x$, attached to the projecting frame A', the vertical connecting-wires $a'\ a^2$, the parallel bell-crank levers $c'\ c^2$, and the horizontal connecting-wires $d'\ d^2$, to the outer ends of which are attached the spiral springs $e'\ e^2$, the wire $d'$ being attached to the lifting-rods $h'\ h'$, which serve to raise the forward needle-bar $b'$, so as to cause their simultaneous movement for engagement or disengagement with the lifting-arms $m\ m$, and the wire $d^2$ being similarly attached to the lifting-rods $h^2\ h^2$, which serve to raise the rear needle-bar $b^2$.

The needle-bars $b'$ and $b^2$ are each provided with the downwardly-extending arms $f'\ f^2$, from which connection may be made to the floor by means of the spiral springs $i^3\ i^2$, which serve to draw the needle-bars $b'\ b^2$ downward, the endwise movement of the needle-bar being effected by means of the pattern screws or pins $j'\ j^2$, which are arranged longitudinally in the bar-links $k'$ of the pattern-chain and operate upon the cams $l'\ l^2$, attached to the chain-engaging rods $m'\ m^2$, which are loosely held in the bearings $n'\ n^2$ of the frame A', the opposite ends of the chain-engaging rods being similarly supported in suitable bearings at the opposite end of the loom. (Not shown in the drawings.)

Upon the sliding rods $m'\ m^2$ are secured the guides G G for the reception of the downwardly-extending arms $f'\ f^2$ of the needle-bars, the said guides being formed of an arm $p'$, which is secured to either one of the chain-engaging rods $m'\ m^2$ by means of the hub $p^2$, and the outer end of the arm $p'$ is provided with a perforation, whereby it is enabled to slide loosely back and forth on the guide-wire $q'$, which is held in the fork $q^2$ of the bracket $r'$, attached to the under side of the breast-beam H of the loom. The arm $p'$ of the guide G is provided with the lateral bosses $r^2\ r^2$, as shown in Fig. 5, the said bosses being made hollow, as shown in the enlarged section, Fig. 6.

The bar $s'$ is secured to the side of the arm $p'$ by means of the bolts $t^3$, under the heads of which is placed the compressed spring $u^2$, which serves to press the bar $s'$ toward the side of the arm $p'$ with a yielding pressure, as shown in Fig. 6, so that when either of the downwardly-extending arms $f'\ f^2$ of the needle-bars $b'\ b^2$ is held in the space $u^3$ between the side of the arm $p'$ and the pressure-bar $s'$ all backlash between the chain-engaging rods $m'\ m^2$ and the needle-bars $b'\ b^2$, connected therewith, will be prevented, the downwardly-extending arms $f'$ or $f^2$ of the needle-bars, as the case may be, sliding back and forth in the space $u^3$ at each movement of the lay, and this removal of backlash in the joint between the chain-engaging rods $m'\ m^2$ and the needle-bars $b'\ b^2$ is an important feature.

The chain-engaging rods $m'\ m^2$ are carried toward the pattern-chain by means of the spiral springs $v^2\ v^3$, which are secured to the floor, and the intervening leather straps $x'\ x^2$, attached to the levers $w^2\ w^3$, which serve to actuate the arms $a^3\ a^4$, the said levers being pivoted upon the pin $y$ of the standard $g^4$ loosely from the said arms, and from the upper ends of the said arms $a^3\ a^4$, which are pivoted upon the pin $y$ or upon the hubs of the levers $w^2\ w^3$, connection is made to the chain-engaging rods $m'\ m^2$ by means of the cords or straps $b^3\ b^4$, the resilience of the springs $v^2\ v^3$ being thus transmitted to the chain-engaging rods $m'\ m^2$ and causing the forward movement of the said chain-engaging rods, in opposition to their backward movement, which is caused by the action of the pattern screws or pins $j'\ j^2$ of the pattern-chain F upon the cams $l'\ l^2$, attached to the chain-engaging rods $m'\ m^2$, respectively. The levers $w^2\ w^3$ are provided with the backwardly-extending arms $c^3\ c^4$, from which connection is made to the forward end of the lever $d^3$ by means of the strap or cord $y'$, so that upon the upward movement of the lever $d^3$, (which is pivoted to the tie-beam $d^5$,) caused by the action of the cam $d^4$ thereon, both of the connecting cords or straps $b^3$ and $b^4$ will be slackened by the backward movement of the upright arms $t^2$ of the levers $w^2\ w^3$ from the edges of the arms $a^3\ a^4$, whereby the chain-engaging rods $m'\ m^2$ will be relieved from the pull of the springs $v^2\ v^3$, so that the said rods and the needle-bars connected therewith may be readily moved by the action of the pattern screws or pins $j'\ j^2$ of the pattern-chain F upon the cams $l'\ l^2$, and upon the completion of the forward movement of the pattern-chain the action of the cam $d^4$ will cause the depression of the lever $d^3$, whereby the springs $v^2\ v^3$ will be again brought to bear upon the chain-engaging rods $m'\ m^2$ to hold the cams $l'\ l^2$ firmly against the screws or pins $j'\ j^2$ of the pattern-chain while the needles are being carried upward into the shed.

The projecting frame A', which serves to support the pattern-chain F, is provided with the bearings $e^3\ e^4$ for the shaft $f^3$ of the sprocket-roll $f^4$, which carries the pattern-chain, the outer end of the shaft $f^3$ of the sprocket-roll being provided with the hand-wheel $z$ for turning the sprocket-roll by hand, when desired, and the inner end of the said shaft is provided with the ratchet-wheel $g'$, by means of which the sprocket-roll is operated, the said ratchet-wheel being actuated to turn the sprocket-roll by means of the pawl $g^2$, one end of which engages with the teeth of the ratchet-wheel and the other end held upon the eccentric $g^3$ of the crank-shaft D. Upon the outer end of the shaft $f^3$ of the sprocket-roll is secured the notched wheel $h^4$, the notches of which are adapted to receive the roller $i^3$ of the spring-actuated pawl $i^4$, which is pivoted to the frame A' and serves to hold the sprocket-roll $f^4$ firmly in its set position, in which the screws or pins $j'$ and $j^2$ are in proper engagement with the cams $l'\, l^2$, and also serving to prevent the backward movement of the sprocket-roll.

The pattern-chain shown and described in this application has been described and claimed in my pending application, Serial No. 525,425, in combination with lappet mechanism. I therefore make no claim in this application to any of the inventions described and claimed in the said pending application.

I claim as my invention—

1. In a lappet-loom, the combination of the lay and the needle-bar carried by the lay, with the pattern pins or projections and the engaging rod held independently of the lay, and a sliding connection between the needle-bar and the engaging rod, substantially as described.

2. In a lappet-loom, the combination of the lay, and the needle-bar carried by the lay, with the pattern pins or projections and the engaging rod held independently of the lay, means for holding the engaging rod against the pattern pins or projections and a sliding connection between the needle-bar and the engaging rod, substantially as described.

3. In a lappet-loom, the combination of the lay, and the needle-bar carried by the lay, with the pattern pins or projections and the engaging rod held independently of the lay, means for holding the engaging rod against the pattern projections, a sliding connection between the needle-bar and the engaging rod, and means for preventing backlash at the sliding connection, substantially as described.

4. In a lappet-loom, the combination of the lay, the needle-bar, and the lifting-rods carried by the lay, with the lifting-arms, and means independent of the lay, for causing the proper engagement and disengagement of the lifting-rods with the lifting-arms, substantially as described.

JAMES R. MacCOLL.

Witnesses:
S. SCHOLFIELD,
A. E. HENUS.